(12) United States Patent
Arbos et al.

(10) Patent No.: US 12,128,422 B2
(45) Date of Patent: Oct. 29, 2024

(54) METHOD AND FACILITY FOR TREATING FLY ASH

(71) Applicant: FIVES FCB, Villeneuve d'Ascq (FR)

(72) Inventors: Joaquin Arbos, Villeneuve d'Ascq (FR); Alain Cordonnier, Villeneuve d'Ascq (FR); Fabrice Lauwerie, Villeneuve d'Ascq (FR)

(73) Assignee: FIVES FCB, Villeneuve d'Ascq (FR)

( * ) Notice: Subject to any disclaimer, the term of this patent is extended or adjusted under 35 U.S.C. 154(b) by 0 days.

(21) Appl. No.: 18/263,295

(22) PCT Filed: Jan. 20, 2022

(86) PCT No.: PCT/FR2022/050110
§ 371 (c)(1),
(2) Date: Jul. 27, 2023

(87) PCT Pub. No.: WO2022/162295
PCT Pub. Date: Aug. 4, 2022

(65) Prior Publication Data
US 2024/0033751 A1    Feb. 1, 2024

(30) Foreign Application Priority Data
Jan. 29, 2021   (FR) ...................... 2100893

(51) Int. Cl.
*B03B 9/04*    (2006.01)
*B03C 7/00*    (2006.01)
(Continued)

(52) U.S. Cl.
CPC .............. *B03B 9/04* (2013.01); *B03C 7/00* (2013.01); *B03C 7/02* (2013.01); *B07B 4/00* (2013.01); *B07B 4/025* (2013.01)

(58) Field of Classification Search
CPC .... B03B 9/04; B03C 7/00; B03C 7/02; B07B 4/00; B07B 4/025
See application file for complete search history.

(56) References Cited

U.S. PATENT DOCUMENTS

| | | | |
|---|---|---|---|
| 6,681,938 B1 | 1/2004 | Link et al. | |
| 2003/0089642 A1* | 5/2003 | Bradley | .............. C04B 18/08 209/11 |
| 2021/0032163 A1* | 2/2021 | Kakizono | ............. B07B 11/02 |

FOREIGN PATENT DOCUMENTS

| | | |
|---|---|---|
| EP | 0961657 B1 | 7/2002 |
| KR | 101903366 B1 | 10/2018 |

(Continued)

OTHER PUBLICATIONS

International Search Report for PCT/FR2022/050110 mailed May 30, 2022, 5 pages.
(Continued)

*Primary Examiner* — Michael McCullough
*Assistant Examiner* — Kalyanavenkateshware Kumar
(74) *Attorney, Agent, or Firm* — NIXON & VANDERHYE

(57) ABSTRACT

Disclosed is a method for treating fly ash containing an initial carbon concentration to obtain ash containing a predetermined final carbon concentration less than the initial concentration, the method including: —a step of granulometric separation of the ash into at least two fractions, a coarse traction and a fine fraction, the coarse fraction having a granulometry greater than the fine fraction; —a step of extracting carbon from the ash; a method wherein the extraction step is subsequent to the separation step, the extraction step being implemented solely on the coarse fraction, by electrostatic separation, the method including a step of drying the ash during which the temperature of the ash is above 60° C.

20 Claims, 1 Drawing Sheet

(51) Int. Cl.
  *B03C 7/02* (2006.01)
  *B07B 4/00* (2006.01)
  *B07B 4/02* (2006.01)

(56) References Cited

FOREIGN PATENT DOCUMENTS

| KR | 102127838 B1 | 6/2020 |
| WO | 2016135383 A1 | 9/2016 |
| WO | WO-2017074201 A1 * | 5/2017 |

OTHER PUBLICATIONS

Written Opinion of the ISA for PCT/FR2022/050110 mailed May 30, 2022, 6 pages.

* cited by examiner

METHOD AND FACILITY FOR TREATING FLY ASH

CROSS-REFERENCE TO RELATED APPLICATIONS

This application is the U.S. national phase of International Application No. PCT/FR2022/050110 filed, Jan. 20, 2022, which designated the U.S. and claims priority to FR 2100893, filed Jan. 29, 2021, the entire contents of each of which are hereby incorporated by reference.

TECHNICAL FIELD OF THE INVENTION

The invention relates to the field of treating fly ash, and more precisely relates to a method for reprocessing fly ash in order to make it suitable for use in a subsequent process. In particular, fly ash is of mineral nature, and has a pozzolanic activity making it advantageous for producing cement and concrete.

TECHNICAL BACKGROUND

The ash is typically the product of thermal power stations using a solid fossil fuel such as coal. If the new-generation thermal power stations produce ash requiring no or little processing before being able to be used for example as an additive in cement, the ash coming from older thermal power stations has a carbon concentration that is too high to be able to be used in its untreated state. This is because carbon is an undesirable constituent for cements and concretes since it degrades the quality and gives them a black color.

Fly ash is mainly used in the cement industry to reduce the quantity of clinker by replacing it with fly ash in the manufacture of the cement, in order to reduce the cost of the latter and to reduce the impact of the production thereof on the environment. Another use consists in adding fly ash in the manufacture of concrete, i.e. at the time of mixing cement with water, aggregates and optionally other adjuvants.

Extracting carbon from the ash in order to reprocess it is known.

The European patent EP0961657 describes a method for extracting carbon in fly ash. This extraction is implemented by means of an electrostatic device.

Although this method makes it possible to extract carbon from fly ash, it is still open to improvement. This is because this method has several drawbacks, including in particular decarbonizing fly ash having a certain moisture content. The applicant has determined that extracting carbon from wet fly ash by means of an electrostatic device impairs the efficacy of the method. In particular, such extraction proves to consume a great deal of energy. Another drawback of this method is that the carbon is extracted over the whole of the fly ash, independently of the granularity, this having the consequence of a loss of efficacy of the extraction of the carbon.

To this end, a first object of the invention is to propose an inexpensive novel method for reprocessing fly ash.

A second object of the invention is to propose an easily controllable novel method for reprocessing fly ash.

A third object of the invention is to propose a novel method for reprocessing fly ash that is particularly adapted for the cement and concrete industry.

A fourth object of the invention is to propose a novel method for reprocessing fly ash the environmental footprint of which is controlled.

SUMMARY OF THE INVENTION

To this end, a method for treating fly ash containing an initial carbon concentration to obtain ash containing a predetermined final carbon concentration less than the initial concentration is firstly proposed, the method comprising:
  a step of granulometric separation of the ash into at least two fractions, a coarse traction and a fine fraction, the coarse fraction having a granulometry greater than the fine fraction,
  a step of extracting carbon from the ash,
  a method wherein the extraction step is subsequent to the separation step, said extraction step being implemented solely on the coarse fraction, by electrostatic separation
  the method comprising a step of drying the ash during which the temperature of said ash is above 60° C.

This method advantageously improves the efficacy of the extraction of the carbon.

Various supplementary features can be provided alone or in combination:
  the granulometric separation is implemented by means of a separation device having a cutoff mesh of between 10 and 200 micrometers;
  the granulometric separation is implemented by means of a separation device having a cutoff mesh of between 20 and 120 micrometers;
  the method comprises a step of cooling the ash so as to obtain a predetermined ash temperature, the cooling step being subsequent to the drying step;
  at the end of the cooling step, the ash is at a temperature of between 20° C. and 60° C.;
  at the end of the cooling step, the ash is at a temperature of between 30° C. and 50° C.;
  the separation step is subsequent to the cooling step;
  this comprises a step of grinding the coarse fraction;
  the ground coarse course fraction is once again this subject of a granulometric separation by means of a cutoff mesh of between 10 and 200 micrometers, preferably between 20 and 120 micrometers;
  30% by mass of the initial ash has a granulometry greater than 45 micrometers;
  10% by mass of the initial ash has a granulometry greater than 100 micrometers.

A plant for treating fly ash containing an initial carbon concentration to obtain ash containing a predetermined final carbon concentration less than the initial concentration is secondly proposed, the ash moving in a given direction of movement in the plant, said plant comprising:
  a granulometric separator,
  an electrostatic separator arranged downstream of the granulometric separator, in the direction of movement of the ash,
the plant furthermore comprises:
  a cooler, said cooler being arranged upstream of the granulometric separator, and
  a drying device,
  the plant being intended to implement a method as previously described.

Various supplementary features can be provided alone or in combination:

this comprises a grinder arranged downstream of the electrostatic separator, in the direction of movement of the ash.

BRIEF DESCRIPTION OF THE FIGURES

Other features and advantages of the invention will emerge during the reading of the following detailed description, for an understanding of which reference will be made to the accompanying drawing, wherein.

DETAILED DESCRIPTION OF THE INVENTION

Figure 1:
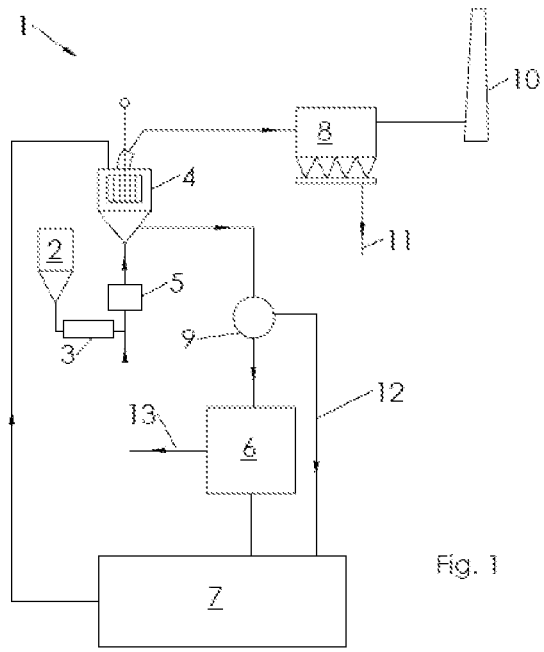
FIG. 1 is a schematic representation of a plant according to a first embodiment of the invention.
Figure 2:
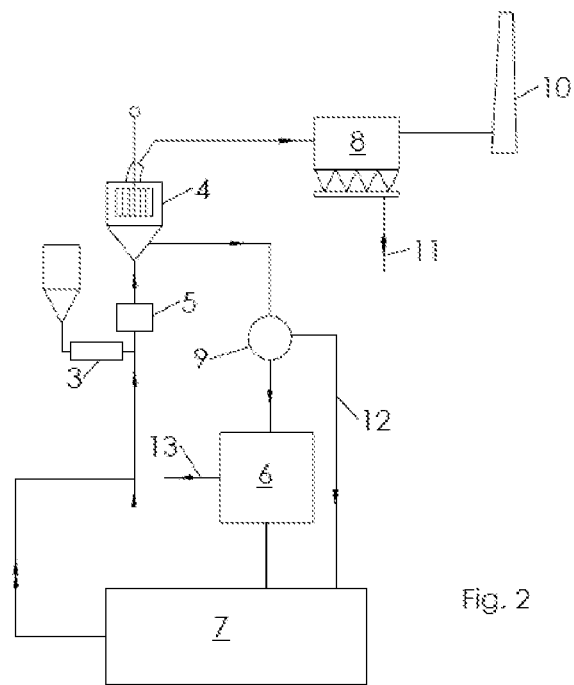
FIG. 2 is a schematic representation of a plant according to a second embodiment of the invention.

FIGS. 1 and 2 show an ash-treatment plant 1.
The plant 1 comprises:
an ash-storage tank 2,
a drying device 3,
a granulometric separator 4 able to separate by granulometric criterion,
a cooler 5,
an electrostatic carbon separator 6,
a grinder 7
a filter 8.

The plant 1 furthermore comprises a device 9 for regulating the flow of ash, a fan (not shown on the drawings), and a chimney 10.

The plant 1 comprises a plurality of pipes and handling devices connecting together the previously mentioned elements.

The ash is moved in the plant 1 by means of a gas, typically air, and/or by gravity and/or with the help of handling devices, such as worms or elevators.

Hereinafter, an ash-treatment method will be described. This method uses the plant 1 of FIGS. 1 and 2.

Initial ash containing an initial concentration of carbon is stored in the storage tank 2. The ash has a carbon concentration of between 5% and 20%. Reference is made here, and in what follows, to concentrations by mass.

The ash is conveyed to the drying device 3. In the drying device 3, high-temperature gases evaporate the water contained in the ash. The method thus comprises a step of drying the ash. In the drying step, the ash is raised to a temperature above 60° C. Advantageously, the ash is raised to a temperature of around 90° C. At the end of the drying step, the water contained in the ash is evaporated, with the exception of insignificant residues, the moisture content being less than 1%.

Advantageously, 30% by mass of the initial ash has a granulometry greater than 45 micrometers. Advantageously, 10% by mass of the initial ash has a granulometry greater than 100 micrometers. These granulometric characteristics allow optimum operation of the plant 1, by allowing an effective extraction of the carbon.

The method advantageously comprises a step of cooling the dry ash. The cooling step is subsequent to the drying step. The dry ash is cooled in the cooler 5.

Advantageously, at the end of the cooling step, the ash is at a temperature between 20° C. and 60° C., and preferably between 30° C. and 50° C. The electrostatic separator 6 achieves an effective extraction of the carbon in these ranges of values.

The method comprises a step of granulometric separation implemented by means of the granulometric separator 4. At the end of the granulometric separation step, the ash is separated into two fractions: a fine fraction, and a coarse fraction the granulometry of which is greater than that of the fine fraction. The granulometric separation step is prior to the extraction step.

By separating the ash into two distinct fractions on a granulometric criterion, it becomes possible to improve the efficacy of the extraction of the carbon. This is because the coarse fraction has a higher concentration of carbon than the fine fraction. By decarbonizing the coarse fraction rather than the fine fraction, the efficacy of the method is improved significantly. In addition, the electrostatic separator achieves a more effective extraction of the carbon on a coarse fraction than on a fine fraction.

Advantageously, the granulometric separator has a cutoff mesh between 10 and 200 micrometers. The cutoff mesh is preferably between 20 and 120 micrometers. In other words, and taking as an example the value of 90 micrometers, the fine fraction has a granulometry below this value, while the coarse fraction has a granulometry above this figure.

The applicant has determined that a cutoff mesh lying in these ranges makes it possible to obtain a coarse fraction the granulometry of which makes it possible to improve the operation of the electrostatic separator, and in doing this, improving the efficacy of the extraction of the carbon.

In a preferred embodiment, the cutoff mesh is equal to 90 micrometers.

The fine fraction emerging from the granulometric separator 4 is not treated. It is sent to the filter 8, where the air is discharged through the chimney 10 after filtration, while the ash of the fine fraction is recovered through an outlet 11 for collecting the finished product, i.e. treated ash.

The coarse fraction emerging from the granulometric separator 4 is sent to the electrostatic separator 6. Between the granulometric separator 4 and the electrostatic separator 6 a flow-rate regulation device 9 is arranged. This regulation device 9 makes it possible to avoid overloading the supply of ash to the electrostatic separator 6, since the latter operates optimally only below a predetermined flow rate. When the flow rate acceptable to the electrostatic separator 6 is reached, the surplus is sent to a diversion circuit 12 by the regulation device 9, to bypass the electrostatic separator 6.

The method comprises a step of extracting carbon from the ash. The extraction step is subsequent to the granulometric separation step. The carbon is extracted by electrostatic separation by means of the electrostatic separator 6. The extracted carbon is discharged from the electrostatic separator 6 through a discharge 13.

Such a method makes it possible to obtain an effective extraction of the carbon. The energy consumed for the extraction is significantly reduced.

At the discharge from the electrostatic separator 6, a decarbonized coarse fraction is obtained. The concentration of carbon in the coarse fraction depends on requirements. However, and in order to meet the requirements of the cement industry, the amount of carbon discharged from the electrostatic separator 6 is less than 5% by mass, and preferably less than 2%.

The decarbonized coarse fraction is next sent to the grinder 7.

This decarbonized ground ash is next sent to the granulometric separator 4. In the granulometric separator 4, some of the decarbonized ash, sufficiently ground and therefore sufficiently fine, will be sent to the filter 8 and collected at the collecting outlet 11 of the filter 8 as fine decarbonized ash. In parallel, some of the decarbonized, but insufficiently ground, ash is returned to the electrostatic separator 6. The fine decarbonized ash contains a predetermined final concentration of carbon below the initial concentration of the ash.

In a variant embodiment shown on FIG. 2, the decarbonized ground ash leaving the grinder 7 is sent to the cooling device.

This method has several advantages, including the fact that it is:
inexpensive,
easily controllable,
particularly adapted for the cement and concrete industry,
effective, and has a controlled environmental footprint.

The invention claimed is:

1. A method for treating fly ash containing an initial carbon concentration to obtain ash containing a predetermined final carbon concentration less than the initial concentration, the method comprising:
a step of granulometric separation of the ash into at least two fractions, a coarse fraction and a fine fraction, the coarse fraction having a granulometry greater than the fine fraction,
a step of extracting carbon from the ash,
wherein the extraction step is subsequent to the separation step, and
wherein said extraction step is implemented solely on the coarse fraction, by electrostatic separation, and is not implemented on the fine fraction,
the method further comprising a step of drying the ash during which the temperature of said ash is above 60° C.

2. The method according to claim 1, wherein the granulometric separation is implemented by means of a separation device having a cutoff mesh of between 10 and 200 micrometers.

3. The method according to claim 2, further comprising a step of cooling the ash so as to obtain a predetermined ash temperature, the cooling step being subsequent to the drying step.

4. The method according to claim 2, further comprising a step of grinding the coarse fraction.

5. The method according to claim 1, wherein the granulometric separation is implemented by means of a separation device having a cutoff mesh of between 20 and 120 micrometers.

6. The method according to claim 5, further comprising a step of cooling the ash so as to obtain a predetermined ash temperature, the cooling step being subsequent to the drying step.

7. The method according to claim 5, further comprising a step of grinding the coarse fraction.

8. The method according to claim 1, further comprising a step of cooling the ash so as to obtain a predetermined ash temperature, the cooling step being subsequent to the drying step.

9. The method according to claim 8, wherein, at the end of the cooling step, the ash is at a temperature between 20° C. and 60° C.

10. The method according to claim 9, wherein the separation step is subsequent to the cooling step.

11. The method according to claim 8, wherein, at the end of the cooling step, the ash is at a temperature of between 30° C. and 50° C.

12. The method according to claim 11, wherein the separation step is subsequent to the cooling step.

13. The method according to claim 8, wherein the separation step is subsequent to the cooling step.

14. The method according to claim 1, further comprising a step of grinding the coarse fraction.

15. The method according to claim 14, wherein the grinding step is subsequent to the extraction step.

16. The method according to claim 14, wherein the ground coarse fraction is once again subjected to granulometric separation by means of a cutoff mesh of between 10 and 200 micrometers.

17. The method according to claim 1, wherein 30% by mass of the initial ash has a granulometry greater than 45 micrometers.

18. The method according to claim 1, wherein 10% by mass of the initial ash has a granulometry greater than 100 micrometers.

19. A plant for treating fly ash, the plant configured to move the fly ash in a given direction of movement in the plant, said plant comprising:
a granulometric separator configured to separate the ash into at least two fractions, a coarse fraction and a fine fraction, the coarse fraction having a granulometry greater than the fine fraction,
an electrostatic separator arranged downstream of the granulometric separator, in the direction of movement of the ash, and configured to implement separation solely on the coarse fraction, by electrostatic separation, and is not configured to implement separation on the fine fraction,
a cooler arranged upstream of the granulometric separator, and
a drying device.

20. The plant for treating fly ash according to claim 19, the plant further comprising a grinder arranged downstream of the electrostatic separator, in the direction of movement of the ash.

* * * * *